(12) United States Patent
Koskinen et al.

(10) Patent No.: US 10,893,464 B2
(45) Date of Patent: Jan. 12, 2021

(54) METHOD AND APPARATUS FOR PHYSICAL CELL IDENTIFICATION SPLIT HANDLING

(75) Inventors: Jussi Pekka Koskinen, Oulu (FI); Jarkko T. Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 377 days.

(21) Appl. No.: 14/237,868

(22) PCT Filed: Oct. 25, 2011

(86) PCT No.: PCT/IB2011/054766
§ 371 (c)(1),
(2), (4) Date: Feb. 7, 2014

(87) PCT Pub. No.: WO2013/027090
PCT Pub. Date: Feb. 28, 2013

(65) Prior Publication Data
US 2014/0213253 A1 Jul. 31, 2014

Related U.S. Application Data

(60) Provisional application No. 61/526,571, filed on Aug. 23, 2011.

(51) Int. Cl.
*H04W 4/00* (2018.01)
*H04W 48/16* (2009.01)
(Continued)

(52) U.S. Cl.
CPC .......... *H04W 48/16* (2013.01); *H04W 48/20* (2013.01); *H04W 8/26* (2013.01); *H04W 48/08* (2013.01); *H04W 60/04* (2013.01)

(58) Field of Classification Search
CPC ..... H04W 48/00; H04W 48/16; H04W 48/20; H04W 8/26; H04W 48/08; H04W 48/18;
(Continued)

(56) References Cited

U.S. PATENT DOCUMENTS 5,966,668 A * 10/1999 Lindroth .............. H04W 84/14
455/446
2010/0069069 A1 * 3/2010 Lee ....................... H04W 48/16
455/435.2
(Continued)

FOREIGN PATENT DOCUMENTS

EP 2288207 2/2011
EP 2346286 A1 * 7/2011 ............ H04W 48/16
(Continued)

OTHER PUBLICATIONS

"Discussion on Applicable Scope of PCI Range for CSG Cells Limited to pPLMN", 3GPP TSG-RAN WG2 #74, R2-113376, Agenda item: 4.1.1, May 9-14, 2011, pp. 1-3.
(Continued)

*Primary Examiner* — Khoi H Tran
*Assistant Examiner* — B M M Hannan
(74) *Attorney, Agent, or Firm* — Mintz Levin Cohn Ferris Glovsky and Popeo, P.C.

(57) ABSTRACT

A method, apparatus and computer program product are provided for deleting and/or not utilizing a PCI/PSC split in instances in which the PCI/PSC split may no longer be valid in a current location. An example method may include determining whether a current physical cell id (PCI) split is configured to camp on a selected cell. The method 5 may further include causing the current PCI split to not be utilized in an instance in which the PCI split is not configured to camp on the selected cell.

23 Claims, 3 Drawing Sheets (51) Int. Cl.
*H04W 48/20* (2009.01)
*H04W 48/08* (2009.01)
*H04W 60/04* (2009.01)
*H04W 8/26* (2009.01)

(58) Field of Classification Search
CPC ..... H04W 88/06; H04W 60/00; H04W 36/14; H04W 36/00; H04W 16/12; H04W 36/20; H04W 36/32; H04W 84/045; H04W 36/0061; H04W 36/08; H04W 84/042; H04W 8/186; H04L 1/00
USPC ......... 455/435.2, 525, 179.1, 444, 436, 517; 370/280, 328
See application file for complete search history.

(56) References Cited

U.S. PATENT DOCUMENTS

| | | | |
|---|---|---|---|
| 2010/0113009 A1* | 5/2010 | Jeong et al. | 455/423 |
| 2010/0120426 A1* | 5/2010 | Singh | H04W 48/12 455/435.1 |
| 2010/0130215 A1* | 5/2010 | Jung | H04W 48/02 455/450 |
| 2010/0291934 A1* | 11/2010 | Lopes | H04W 24/02 455/446 |
| 2010/0323633 A1* | 12/2010 | Pani | H04W 24/10 455/67.14 |
| 2010/0325267 A1* | 12/2010 | Mishra et al. | 709/224 |
| 2011/0039594 A1* | 2/2011 | Liu | H04W 48/02 455/515 |
| 2011/0105123 A1 | 5/2011 | Lee et al. | |
| 2011/0171915 A1* | 7/2011 | Gomes et al. | 455/73 |
| 2011/0171926 A1* | 7/2011 | Faccin | H04W 48/18 455/404.1 |
| 2011/0176509 A1* | 7/2011 | Hole | H04W 36/0055 370/331 |
| 2011/0190000 A1* | 8/2011 | Kwun | H04W 72/00 455/450 |
| 2011/0201345 A1* | 8/2011 | Han | H04W 24/02 455/450 |
| 2011/0216732 A1* | 9/2011 | Maeda | H04W 4/08 370/329 |
| 2011/0261777 A1* | 10/2011 | Maeda | H04W 48/20 370/329 |
| 2012/0021725 A1* | 1/2012 | Rune | H04W 48/16 455/411 |
| 2012/0044910 A1* | 2/2012 | Maeda | H04L 5/0005 370/332 |
| 2012/0083245 A1* | 4/2012 | Adjakple | H04W 4/08 455/411 |
| 2012/0088505 A1* | 4/2012 | Toh | H04W 8/186 455/434 |
| 2012/0135731 A1* | 5/2012 | Rangaiah | H04W 48/20 455/434 |
| 2012/0157095 A1* | 6/2012 | Fodor | H04W 4/08 455/434 |
| 2012/0196603 A1* | 8/2012 | Mochizuki | H04W 48/02 455/436 |
| 2012/0213161 A1* | 8/2012 | Maeda | H04L 5/0042 370/328 |
| 2012/0244903 A1* | 9/2012 | Fong et al. | 455/517 |
| 2012/0302241 A1* | 11/2012 | Klingenbrunn et al. | 455/436 |
| 2013/0148586 A1* | 6/2013 | Ryu | H04W 24/10 370/328 |
| 2013/0217402 A1* | 8/2013 | Lin | H04W 72/1226 455/450 |
| 2013/0273920 A1* | 10/2013 | Magadi Rangaiah | H04W 48/20 455/437 |

FOREIGN PATENT DOCUMENTS

| | | | | |
|---|---|---|---|---|
| EP | 2472947 | | 7/2012 | |
| EP | 2496022 | | 9/2012 | |
| WO | 2010049911 | * | 5/2010 | ............ H04W 36/04 |
| WO | WO-2010110706 A1 | * | 9/2010 | ............ H04W 12/08 |
| WO | 2011041754 | * | 4/2011 | ............ H04W 8/18 |
| WO | 2011/052190 A1 | | 5/2011 | |
| WO | 2011097985 | | 8/2011 | |

OTHER PUBLICATIONS

"Applicable PLMN Scope of PCI/PSC Range for CSG Cells", 3GPP TSG-RAN WG2 #75, R2-114517, Agenda item: 4.2.3, Aug. 22-26, 2011, pp. 1-3.
"3rd Generation Partnership Project; Technical Specification Group Radio Access Network; Evolved Universal Terrestrial Radio Access (E-UTRA); User Equipment (UE) procedures in idle mode (Release 10)", 3GPP TS 36.304, v10.2.0, Jun. 2011, pp. 1-33.
International Search Report received for corresponding Patent Cooperation Treaty Application No. PCT/IB2011/054766, dated Sep. 17, 2012, 5 pages.
Extended European Search Report received for corresponding European Patent Application No. 11871297.5, dated May 19, 2015, 11 pages.
"[73#40] UMTS/LTE: CSG Handling—Discussion document", 3GPP TSG-RAN WG2 Meeting #73bis, R2-111951, Agenda item: 4.1, Nokia Corporation, Apr., 2011, 13 pages.

* cited by examiner

METHOD AND APPARATUS FOR PHYSICAL CELL IDENTIFICATION SPLIT HANDLING

RELATED APPLICATION

This application was originally filed as PCT Application No. PCT/IB2011/054766 filed Oct. 25, 2011, which claims priority benefit from U.S. Application No. 61/526,571, filed Aug. 23, 2011.

TECHNOLOGICAL FIELD

Embodiments of the present invention relate generally to wireless communications technology and, more particularly, relate to a method, apparatus, and computer program product for enhancing physical cell identification (PCI)/primary synchronization code (PSC) split handling.

BACKGROUND

Generally, a mobile terminal acquires broadcast system information messages, including PCI/PSC split information from a closed subscriber group (CSG) cell (in occasions when the mobile terminal enters the coverage area of such cell). The mobile terminal may then store the PCI/PSC split information. Other non-CSG cells may optionally broadcast PCI/PSC split information, which may also be received and stored by a mobile terminal.

In one example the PCI/PSC split may be valid for a particular public land mobile network (PLMN). However this example has various drawbacks including most notably that a PCI/PSC split is not necessarily tied to a particular PLMN, because the PCI/PSC split is related to physical layer functions such as synchronization signals. Physical layer functions are generally more closely related to a particular carrier. See for example 3GPP R2-113376, which is hereby incorporated by reference in its entirety.

In contrast and in another example, the PCI/PSC split may be made valid for a particular carrier frequency. See for example 3GPP R2-114518, which is hereby incorporated by reference in its entirety. While tying a PCI/PSC split to a carrier frequency is generally beneficial, a PCI/PSC split that is tied to a carrier frequency remains in effect for a lengthy duration, such as for twenty four hours. In some examples, the mobile terminal may have rendered the current split invalid based on any number of factors, such as a relocation, due to the lengthy duration. In this example, until the PCI/PSC split expires, the mobile terminal may continue to use the existing and outdated PCI/PSC split thereby resulting in the mobile terminal potentially not being able to find a cell, or the best available cell, to camp on or in other words may not be able to connect to the network.

BRIEF SUMMARY

A method, apparatus and computer program product are therefore provided according to an example embodiment to delete and/or not utilize a PCI/PSC split in instances in which the PCI/PSC split may not be longer valid in a current location. Based on an inability to use current PCI/PSC split information to connect to an access point, a mobile terminal may be configured to delete and/or not utilize its PCI/PSC split information. In an embodiment, the method, apparatus and computer program product may determine that the mobile terminal is in a location in which the current PCI/PSC split may not be valid, and thus may cause the PCI/PSC split information to be deleted and/or not utilized.

In an embodiment, a method includes determining whether a current PCI split is configured to camp on a selected cell. A method also includes causing the current PCI split to not be utilized in an instance in which the PCI split is not configured to camp on the selected cell.

In another embodiment, an apparatus comprising a processor and a memory including software, the memory and the software configured to, with the processor, cause the apparatus to at least to determine whether a current PCI split is configured to camp on a selected cell. The apparatus is further caused to cause the current PCI split to not be utilized in an instance in which the PCI split is not configured to camp on the selected cell.

In a further embodiment, a computer program product comprising at least one computer readable non-transitory memory having program code stored thereon, the program code which when executed by an apparatus cause the apparatus at least to determine whether a current PCI split is configured to camp on a selected cell. A computer program product also includes program code that is further configured to cause the current PCI split to not be utilized in an instance in which the PCI split is not configured to camp on the selected cell.

In yet another embodiment, an apparatus is provided that includes means for determining whether a current PCI split is configured to camp on a selected cell. An apparatus further comprises means for causing the current PCI split to not be utilized in an instance in which the PCI split is not configured to camp on the selected cell.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in a server, a cellular network device, or other network device.

In an example embodiment a mobile terminal is configured to read a PCI/PSC (e.g. in some example embodiments a csg-PhysCellIdRange, CSG PSC Split Information, PCI/PSC split and/or the like) split from a CSG cell, such as an access point, enhanced Node B, home Node B or the like. The PCI/PSC split information, for example, may remain in effect for predefined duration such as twenty four hours. Example embodiments, as described herein, are configured to determine an instance in which the PCI/PSC split information is no longer valid. As described herein, a valid PCI/PCI split refers to an instance in which a PCI/PCS split enables a mobile terminal to camp on a cell.

The mobile terminal is thus further configured to delete and/or not utilize the PCI/PSC split, in an instance in which enables the mobile terminal to read a new PCI/PSC split from a cell. Alternatively or additionally, if a mobile terminal cannot access a CSG cell, then the mobile terminal may exclude all the cells having the indicated PCI/PSC split from a reselection and cell selection criteria evaluation. Further, example embodiments determine whether the PCI/PSC split information is invalid using a plurality of mechanisms. For example, the mobile terminal may be configured to delete and/or not utilize its PCI/PSC split in an instance in which it is unable to connect to an access point. Alternatively or additionally, the mobile terminal may determine its PCI/PSC split information is invalid based on a tracking area update and/or the reselection of a PLMN.

Figure 1:
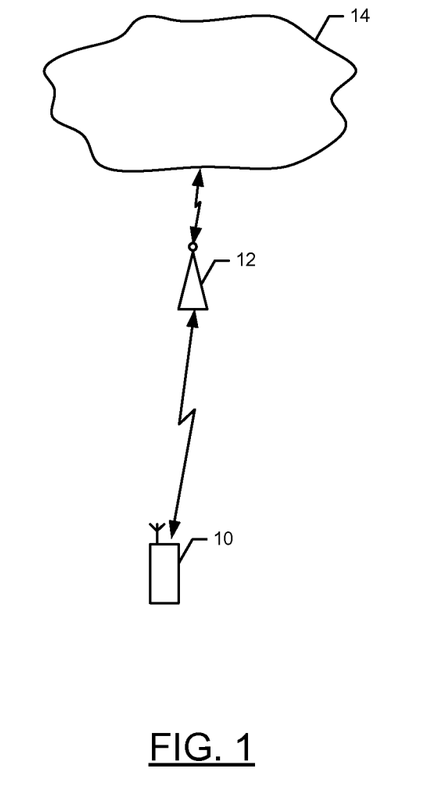
FIG. 1 is a schematic representation of a system having a mobile terminal that may determine PCI/PSC split information from a access point and that may benefit from an embodiment of the present invention.

Although the method, apparatus and computer program product may be implemented in a variety of different systems, one example of such a system is shown in FIG. 1, which includes a first communication device (e.g., mobile terminal 10) that is capable of communication via an access point 12, such as a base station, a CSG cell, a home Node B, a Node B, an evolved Node B (eNB) or other access point, with a network 14 (e.g., a core network). While the network may be configured in accordance with Long Term Evolution (LTE) or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

The network 14 may include a collection of various different nodes, devices or functions that may be in communication with each other via corresponding wired and/or wireless interfaces. For example, the network may include one or more cells, including access point 12, which may serve a respective coverage area. The access point 12 could be, for example, part of one or more cellular or mobile networks or PLMNs. In turn, other devices such as processing devices (e.g., personal computers, server computers or the like) may be coupled to the mobile terminal 10 and/or other communication devices via the network.

A communication device, such as the mobile terminal 10 (also known as user equipment (UE)), may be in communication with other communication devices or other devices via the access point 12 and, in turn, the network 14. In some cases, the communication device may include an antenna for transmitting signals to and for receiving signals from an access point.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal 10 may include one or more processors that may define processing circuitry either alone or in combination with one or more memories. The processing circuitry may utilize instructions stored in the memory to cause the mobile terminal 10 to operate in a particular way or execute specific functionality when the instructions are executed by the one or more processors. The mobile terminal 10 may also include communication circuitry and corresponding hardware/software to enable communication with other devices and/or the network 14.

Figure 2:
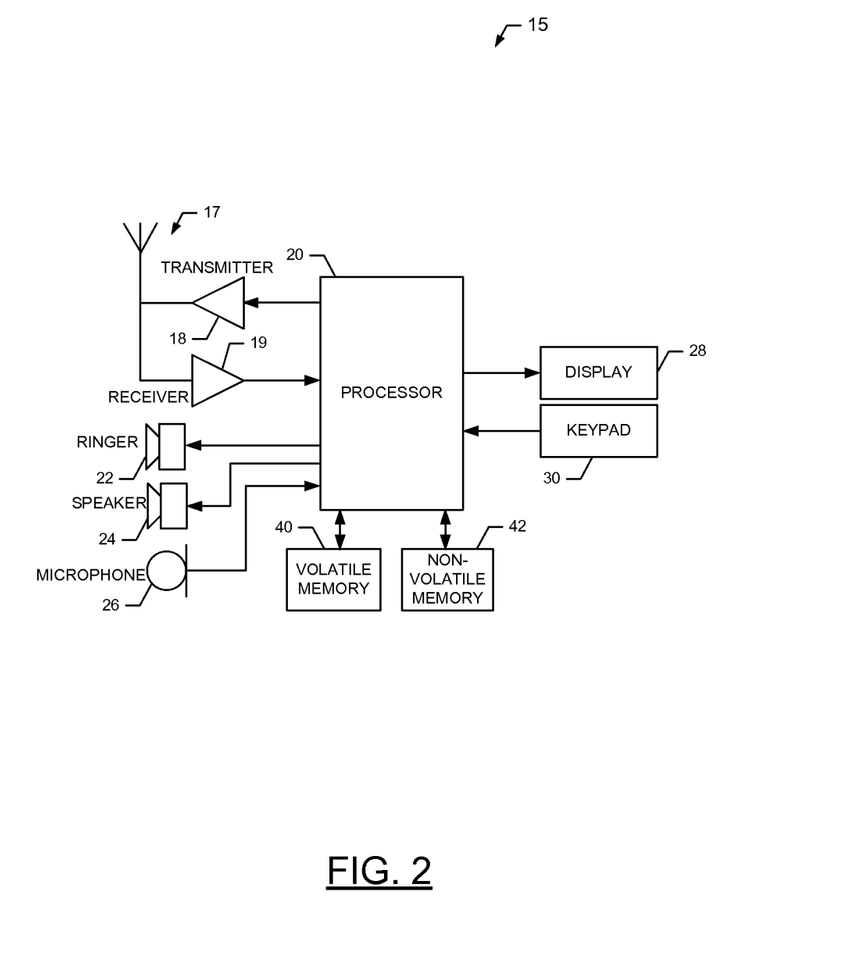
FIG. 2 is a block diagram of an apparatus that may be embodied by a mobile terminal in accordance with one embodiment of the present invention.

In one embodiment, for example, the mobile terminal 10 may be embodied as or otherwise include an apparatus 20 as generically represented by the block diagram of FIG. 2. While the apparatus 20 may be employed, for example, by a mobile terminal 10, it should be noted that the components, devices or elements described below may not be mandatory and thus some may be omitted in certain embodiments. Additionally, some embodiments may include further or different components, devices or elements beyond those shown and described herein.

In this regard, FIG. 2 illustrates an example block diagram of an apparatus 15. While several embodiments of the user equipment (e.g., apparatus 15) are illustrated and will be hereinafter described for purposes of example, other types of user terminals, such as mobile telephones, mobile computers, portable digital assistants (PDAs), pagers, laptop computers, desktop computers, gaming devices, televisions, and other types of electronic systems, may employ embodiments of the present invention.

As shown, the apparatus 15 may include an antenna 17 (or multiple antennas 17) in communication with a transmitter 18 and a receiver 19. The apparatus 15 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof.

Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the apparatus 15 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the apparatus 15 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the apparatus 15. For example, the processor 20 may comprise a digital signal processor device, a microprocessor device, an analog-to-digital converter, a digital-to-analog converter, and/or the like. Control and signal processing functions of the apparatus 15 may be allocated between these devices according to their respective capabilities. Further, the processor may comprise functionality to operate one or more software programs, which may be stored in memory. For example, the processor 20 may be capable of operating a connectivity program, such as a web browser. The connectivity program may allow the apparatus 15 to transmit and receive web content, such as location-based content, according to a protocol, such as Wireless Application Protocol (WAP), hypertext transfer protocol (HTTP), and/or the like. The apparatus 15 may be capable of using a Transmission Control Protocol/Internet Protocol (TCP/IP) to transmit and receive web content across the internet or other networks.

The apparatus 15 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

The apparatus 15 may comprise memory, such as a smart cart, subscriber identity module or subscriber identification module (SIM), a removable user identity module (R-UIM), and/or the like, which may store information elements related to a mobile subscriber. In addition to the SIM, the mobile terminal may comprise other removable and/or fixed memory. The apparatus 15 may include other non-transitory memory, such as volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the apparatus 15.

Figure 3:
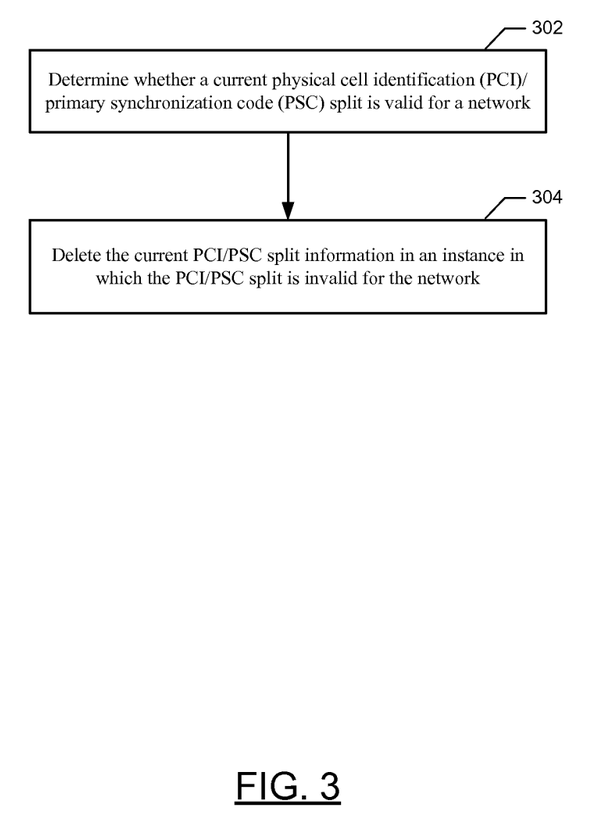
FIG. 3 is a flow chart illustrating operations performed in accordance with one embodiment of the present invention.

FIG. 3 illustrates an example flowchart of the operations performed by a method, apparatus and computer program product, such as mobile terminal 10 of FIG. 1, in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 40 of an apparatus employing an embodiment of the present invention and executed by a processor 20 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 3, when executed, convert a computer or processing circuitry into a particular machine configured to perform an example embodiment of the present invention. Accordingly, the operations of FIG. 3 define an algorithm for configuring a computer or processing to perform an example embodiment. In some cases, a general purpose computer may be provided with an instance of the processor which performs the algorithm of FIG. 3 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

FIG. 3 is an example flowchart illustrating enhanced PCI/PSC split handling performed in accordance with an embodiment of the present invention. As shown in operation 302, the apparatus 15 embodied, for example, by a mobile terminal 10, may include means, such as the transmitter 18, the receiver 19, the processor 20, or the like, for determining whether a current PCI split is configured to camp on a selected cell. This determination may be made in several different manners. In an embodiment, a mobile terminal, such as mobile terminal 10, is configured to attempt to connect to one or more access points, such as access point 12. However, in an instance in which the mobile terminal is unable to connect to an access point then the apparatus 15 embodied by the mobile terminal 10, such as by the processor 20, may be configured to determine that the PCI/PSC split is invalid. In some embodiments, apparatus 15, embodied by a mobile terminal, such as the processor 20 may attempt to connect for a predetermined time and if unsuccessful and/or in an instance in which time expires, the apparatus 15, such as the process 20, may then determine that the PCI/PSC split is invalid. Alternatively or additionally, the mobile terminal may determine that the PCI/PSC split is invalid, in an instance in which the mobile terminal, such as mobile terminal 10, enters any cell selection state. Alternatively or additionally, the mobile terminal may apply the PCI/PSC split when the mobile terminal is camped on a cell (e.g. camped normally, camped on any cell state or the like, but not in any cell selection state or the like).

Alternatively or additionally, the apparatus 15, embodied by the mobile terminal, such as mobile terminal 10, is configured to cause, for example using means such as the receiver 19, the processor 20, or the like, a tracking area update, a location/router area update to be received. In an embodiment, the tracking area update includes tracking area information which may be a list of access points where a particular PCI/PSC split is valid. In other embodiments other location or routing information may be received by the apparatus, such as by the receiver 19, the processor 20 or the like, that may enable a mobile terminal, such as mobile terminal 10, to determine its location. In an instance in which the received tracking area update indicates a change in location, then the apparatus 15, embodied by the mobile terminal 10, may determine that the PCI/PSC split is invalid. Alternatively or additionally the apparatus 15, embodied by the mobile terminal 10, such as by the receiver 19, the processor 20, or the like, may receive a tracking area update, or a location/routing update in UMTS Terrestrial Radio Access Network (UTRAN), wherein the tracking area update may include an invalid tracking area for a particular PCI/PSC split, thereby permitting the apparatus, such as the processor 20 or the like, to determine that the PCI/PSC split is invalid if the mobile terminal in an invalid tracking area.

Alternatively or additionally the apparatus 15, embodied by the mobile terminal 10, such as by the receiver 19, the processor 20, or the like, may receive an indication (e.g. a list of tracking, location, and/or routing areas) of an area where a PCI/PSC split is valid. In an instance in which the apparatus 15, embodied by the mobile terminal 10 is outside the area where the PCI/PSC split is valid then the PCI/PSC split may be deleted and/or not utilized. The apparatus, such as the processor 20 or the like, of this embodiment may, based upon whether or not the mobile terminal is in the area in which the PCI/PSC split is valid or not, the location of the mobile terminal may be determined in various manners including for example a global positioning system. The apparatus 15, embodied by the mobile terminal 10, such as by the processor 20, or the like, may determine where a PCI/PSC split may or may not be used.

Alternatively or additionally, the apparatus 15, embodied by the mobile terminal 10, such as by the processor 20, or the like, is configured to reselect a PLMN. In an instance in which reselection to another PLMN has occurred, then the apparatus 15, embodied by the mobile terminal 10, the processor 20, or the like, may determine that the PCI/PSC split is invalid.

As shown in operation 304, the apparatus 15 embodied, for example, by a mobile terminal 10, may include means, such as the processor 20, for deleting the current PCI/PSC split information in an instance in which the PCI/PSC split is determined to be invalid for the network. Once the PCI/PSC is deleted and/or for example marked such that it is not used, the apparatus 15, embodied by the mobile terminal 10, such as by the processor 20 or the like, may obtain another PCI/PSC split that is valid for the network in which the mobile terminal is presently located. While the PIC/PSC split may be deleted and/or not utilized in order to trigger the acquisition of another PCI/PSC split, the apparatus 15, embodied by the mobile terminal 10, such as by the processor 20 or the like, may alternatively or additionally, reset the PCI/PSC split and/or perform an operation that causes the mobile terminal to obtain a new PCI/PSC split. Deleting as used herein may include resetting, not using, not applying, erasing, overwriting, marking unusable, corrupting and/or the like.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   determining that a user equipment is in an any cell selection state, the user equipment in the any cell selection state is not camped on any cell and is attempting to identify an acceptable cell associated with any public land mobile network to camp on;
   in response to determining that the user equipment is in the any cell selection state, determining that a current physical cell identification split is invalid, the current physical cell identification split comprising information identifying a range of closed subscriber group cells; and
   in response to the determination that the current physical cell identification split is invalid, voiding the current physical cell identification split to at least prevent the current physical cell identification split from being utilized by the user equipment to identify the acceptable cell.

2. The method of claim 1, further comprising:
   in response to an out of network search, voiding the current physical cell identification split.

3. The method of claim 1, further comprising:
   in response to an expiration of a predetermined quantity of time, voiding the current physical cell identification split.

4. The method of claim 1, further comprising:
   receiving at least one of a tracking area update or a location area update; and
   in response to the tracking area update and/or the location area update indicating a change in location, voiding the current physical cell identification split.

5. The method of claim 1, further comprising:
   in response to a reselection from a first public land mobile network to a second public land mobile network, voiding the current physical cell identification split.

6. The method of claim 1, further comprising:
   receiving at least one of a tracking area update or a location area update;
   receiving an indication, based on the at least one of the tracking area update or the location area update, that a current location is in an invalid tracking area for the current physical cell identification split; and
   in response to receiving the indication, voiding the current physical cell identification split.

7. The method of claim 1, further comprising:
   in response to the user equipment being camped on a cell, applying the current physical cell identification split.

8. The method of claim 1, wherein the voiding of the current physical cell identification split comprises at least one of resetting, deleting, not using, not applying, erasing, overwriting, marking unusable, or corrupting the physical cell identification split.

9. The method of claim 1, wherein the information identifying the range of closed subscriber group cells comprises a closed group subscriber group physical cell identification range.

10. The method of claim 1, wherein the information identifying the range of closed subscriber group cells comprises a closed group subscriber primary synchronization code split information.

11. The method of claim 1, wherein voiding the current physical cell identification split further triggers an acquisition of another physical cell identification split by the user equipment.

12. An apparatus comprising:
   at least one processor and
   at least one memory including software and computer program code configured to, with the at least one processor, cause the apparatus to at least:
   determine that the apparatus is in an any cell selection state, the apparatus in the any cell selection state is not camped on any cell and is attempting to identify an acceptable cell associated with any public land mobile network to camp on;
   in response to determining that the apparatus is in the any cell selection state, determine that a current physical cell identification split is invalid, the current physical cell identification split comprising information identifying a range of closed subscriber group cells; and
   in response to the determination that the current physical cell identification split is invalid, void the current physical cell identification split to at least prevent the current physical cell identification split from being utilized by the apparatus to identify the acceptable cell.

13. The apparatus of claim 12, wherein the at least one memory including the computer program code is further configured to, with the at least one processor, cause the apparatus to at least void the current physical cell identification split in response to an out of network search.

14. The apparatus of claim 12, wherein the at least one memory including the computer program code is further configured to, with the at least one processor, cause the apparatus to at least void the current physical cell identification split in response to an expiration of a predetermined quantity of time.

15. The apparatus of claim 12, wherein the at least one memory including the computer program code is further configured to, with the at least one processor, cause the apparatus to at least:
receive at least one of a tracking area update or a location area update; and
in response the tracking area update and/or the location area update indicating a change in location, void the current physical cell identification split.

16. The apparatus of claim 12, wherein the at least one memory including the computer program code is further configured to, with the at least one processor, cause the apparatus to at least:
in response to a reselection from a first public land mobile network to a second public land mobile network, void the current physical cell identification split.

17. The apparatus of claim 12, wherein the at least one memory including the computer program code is further configured to, with the at least one processor, cause the apparatus to at least:
receive at least one of a tracking area update or a location area update;
receive an indication, based on the at least one of the tracking area update or the location area update, that a current location is in an invalid tracking area for the current physical cell identification split; and
in response to receiving the indication, void the current physical cell identification split.

18. The apparatus of claim 12, wherein the at least one memory including the computer program code is further configured to, with the at least one processor, cause the apparatus to at least apply the current physical cell identification split, in response to the apparatus being camped on a cell.

19. The apparatus of claim 12, wherein the voiding of the current physical cell identification split comprises at least one of resetting, deleting, not using, not applying, erasing, overwriting, marking unusable, or corrupting the physical cell identification split.

20. The apparatus of claim 12, wherein the information identifying the range of closed subscriber group cells comprises a closed group subscriber group physical cell identification range.

21. The apparatus of claim 12, wherein the information identifying the range of closed subscriber group cells comprises a closed group subscriber primary synchronization code split information.

22. A non-transitory computer-readable storage medium including computer code, which when executed by at least one processor, cause an apparatus to at least:
determine that an apparatus is in an any cell selection state, the apparatus in the any cell selection state is not camped on any cell and is attempting to identify an acceptable cell associated with any public land mobile network to camp on;
in response to determining that the apparatus is in the any cell selection state, determine that a current physical cell identification split is invalid, the current physical cell identification split comprising information identifying a range of closed subscriber group cells; and
in response to the determination that the current physical cell identification split is invalid, void the current physical cell identification split to at least prevent the current physical cell identification split from being utilized by the apparatus to identify the acceptable cell.

23. The computer program product of claim 22, wherein the voiding of the current physical cell identification split comprises at least one of resetting, deleting, not using, not applying, erasing, overwriting, marking unusable, or corrupting the physical cell identification split.

* * * * *